(12) United States Patent
Huelsen et al.

(10) Patent No.: US 12,172,604 B2
(45) Date of Patent: Dec. 24, 2024

(54) VEHICLE ROOF COMPRISING A SUPPORT AND A ROOF MODULE

(71) Applicant: Webasto SE, Stockdorf (DE)

(72) Inventors: Michael Huelsen, Stockdorf (DE); Engelbert Hirschvogel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 208 days.

(21) Appl. No.: 17/794,506

(22) PCT Filed: Jan. 21, 2021

(86) PCT No.: PCT/EP2021/051361
§ 371 (c)(1),
(2) Date: Jul. 21, 2022

(87) PCT Pub. No.: WO2021/160405
PCT Pub. Date: Aug. 19, 2021

(65) Prior Publication Data
US 2023/0055797 A1    Feb. 23, 2023

(30) Foreign Application Priority Data

Feb. 13, 2020   (DE) ..................... 10 2020 103 696.5

(51) Int. Cl.
*B62D 25/06*    (2006.01)
*B60R 9/04*    (2006.01)
(Continued)

(52) U.S. Cl.
CPC ............ *B60R 9/04* (2013.01); *B60R 11/0258* (2013.01); *B62D 25/06* (2013.01); *B60R 2300/105* (2013.01); *B60R 2300/301* (2013.01)

(58) Field of Classification Search
CPC . B62D 25/06; B60R 11/0258; B60R 11/0264; B60R 11/04; B60R 2300/00;
(Continued)

(56) References Cited

U.S. PATENT DOCUMENTS

| 7,081,810 B2 | 7/2006 | Henderson et al. |
| 10,046,713 B2 * | 8/2018 | Maranville ............... B60R 9/04 |

(Continued)

FOREIGN PATENT DOCUMENTS

| DE | 202017006640 U1 | 4/2019 |
| DE | 102018129839 A1 | 5/2019 |
| JP | 2009113784 A | 5/2009 |

OTHER PUBLICATIONS

International Search Report for PCT/EP2021/051361 mailed May 7, 2021, in English and German (6 pages).
(Continued)

*Primary Examiner* — Dennis H Pedder
(74) *Attorney, Agent, or Firm* — Fitch, Even, Tabin & Flannery, LLP

(57) ABSTRACT

A vehicle roof having a support on the vehicle body shell, a roof module disposed on the support and having a roof skin, and a sensor system having at least one sensor module having at least one environment sensor for detecting a vehicle environment, the environment sensor being disposed in a lateral edge area of the roof module associated with a lateral roof edge and being covered by the roof skin, the roof skin having a sensor see-through area for the environment sensor, the sensor see-through area being oriented in the transverse roof direction and being situated higher than the associated roof edge or an adjacent area of the associated roof edge and/or being located above the associated roof edge.

11 Claims, 9 Drawing Sheets

(51) Int. Cl.
*B60R 11/02* (2006.01)
*B60R 11/04* (2006.01)

(58) Field of Classification Search
CPC ........ B60R 2300/102; B60R 2300/105; B60R 2300/301; B60R 2300/303; B60R 2300/802; B60R 2300/8093; G01S 13/931; G01S 17/931
USPC ....................................................... 296/210
See application file for complete search history.

(56) References Cited

U.S. PATENT DOCUMENTS

| | | | |
|---|---|---|---|
| 10,435,077 B2* | 10/2019 | Schmidt | ............. B60S 1/46 |
| 10,514,303 B2 | 12/2019 | Krishnan et al. | |
| 2016/0297482 A1 | 10/2016 | Sakabe et al. | |
| 2017/0261273 A1 | 9/2017 | Maranville et al. | |
| 2018/0037267 A1* | 2/2018 | Williams | ............. G01S 7/4813 |
| 2019/0003895 A1 | 1/2019 | Krishnan et al. | |
| 2019/0161125 A1 | 5/2019 | Schmidt | |

OTHER PUBLICATIONS

Written Opinion of the International Searching Authority for PCT/EP2021/051361 mailed Aug. 25, 2022, in English (7 pages).

* cited by examiner

VEHICLE ROOF COMPRISING A SUPPORT AND A ROOF MODULE

CROSS-REFERENCE TO RELATED APPLICATION

This application is a U.S. national phase application filed under 35 U.S.C. § 371 of International Application No. PCT/EP2021/051361, filed Jan. 21, 2021, designating the United States, which claims priority from German Patent Application Number DE 10 2020 103 696.5, filed Feb. 13, 2020, which are hereby incorporated herein by reference in its entirety for all purposes.

FIELD

The invention relates to a vehicle roof comprising a roof module, a support on the vehicle body shell, and a sensor system having at least one sensor module comprising at least one environment sensor for detecting a vehicle environment.

BACKGROUND

A vehicle roof of this kind is known from practice and is in particular a roof of a passenger car comprising a roof module which can be placed on top of a vehicle body, which forms a vehicle body shell, as a separate component, the vehicle body having roof side rails as a support on the vehicle body shell. The roof module can be a purely fixed roof element which has a transparent portion for forming a panoramic roof, the transparent portion forming a see-through area. Alternatively, the roof module can have a roof opening system which comprises a displaceable lid element by means of which a roof opening can be opened or closed at will. Furthermore, the roof module always comprises a roof skin, which forms an outer visible surface of the roof module and which can be partially transparent to form the see-through area and which borders the roof opening in the case of a roof module having a roof opening system. In an installed position, the roof module is tightly attached to the roof side rails.

Furthermore, it is known for sensor modules enabling the vehicle in question to drive autonomously or semi-autonomously to be disposed on vehicle roofs. These sensor modules comprise environment sensors by means of which vehicle surroundings can be monitored and detected. So far, the sensor modules have been placed on top of the vehicle roof since the vehicle roof is typically the highest point of a vehicle, from where the vehicle surroundings are easily visible. The sensor modules configured as on-top attachments lead to a vehicle appearance which typically does not satisfy customer demands. Furthermore, the field of view of the environment sensors may be obstructed in the transverse vehicle direction since a roof side rail is located in said field of view.

SUMMARY

The object of the invention is to provide a vehicle roof which offers as large a field of view as possible in the transverse roof direction for environment sensors while satisfying high visual demands.

According to the invention, this object is attained by the vehicle roof having the features of claim 1.

So the invention proposes a vehicle roof comprising a roof module whose roof skin is configured in such a manner in the lateral edge areas that it at least partially covers or extends over an environment sensor, a sensor see-through area of the roof skin being situated higher than or projecting over an adjacent and associated roof edge and/or being located above the associated roof edge or an adjacent area of the roof edge. The configuration of the roof skin with the sensor see-through area according to the invention can ensure that no part or only a very small part of the roof edge is located in the field of view of the environment sensor, which means that the environment sensor can detect the vehicle environment unhindered in the transverse direction of the vehicle in question, even in close proximity of the vehicle. The roof skin thus forms a raised roof line relative to the roof edge in question at least in the area of the environment sensor with the result that the environment sensor can "look" downward and/or downward to the rear across the roof edge through sensor see-through area without the field of view being obstructed by the roof edge. This configuration of the roof skin allows a lateral environment sensor or the sensor module comprising the lateral environment sensor to be harmoniously integrated into the roof structure or the roof module, which offers great advantages in terms of design, optics, crash safety, functional integration of cleaning elements, heating elements, cooling elements, and/or the like. So the fact that the roof skin covers the lateral environment sensor results in a visually harmonious and in particular visually pleasing integration into the roof module.

The support on the vehicle body shell can in particular also comprise roof side rails which form the lateral roof edges with which the environment sensors are associated.

The sensor see-through areas can be openings of the roof skin or integral or separate parts of the roof skin.

The environment sensors are preferably disposed in the lateral edge areas of the roof module which are spaced apart from a front and a rear roof module edge in the longitudinal vehicle direction. For example, the environment sensors are disposed approximately centrally in relation to the vehicle length and/or at a certain minimum distance from the edges extending in the transverse vehicle direction, which can be 30 cm to 150 cm.

The environment sensor of the roof module can be configured in various ways, can use electromagnetic radiation and/or acoustic waves and can comprise a lidar sensor, a radar sensor, an optical sensor, such as a camera, an antenna feature, and/or the like.

If the environment sensor of the roof module is a lidar sensor, it preferably operates in a wavelength range of approximately 905 nm or approximately 1550 nm. A camera used as an environment sensor can operate in the wavelength range of visible light and/or in the infrared range.

The invention provides a vehicle roof having a roof sensor module (RSM) which enables the vehicle in question to drive autonomously or semi-autonomously.

A vehicle equipped with the vehicle roof according to the invention and configured as an autonomously driving vehicle drives autonomously without at least substantial intervention of a driver when in the autonomous driving mode. In a semi-autonomous driving mode, the vehicle roof according to the invention forms part of a driver assistance system, for example.

So in an integrated manner, the roof module of the vehicle roof according to the invention forms a structural member in which components required for autonomous or semi-autonomous driving of the vehicle in question are accommodated. The roof module, in which a plurality of functional elements can be integrated, can be connected to a vehicle body or a vehicle body shell, which comprises the roof side rails, as a compact structural unit by a vehicle manufacturer to form the vehicle roof. The roof module can in particular also comprise functional elements which have been disposed in the area of a rearview mirror, in the area of an outer bow or in any other place in known motor vehicles.

The roof sensor module can be provided with a transparent fixed roof portion and/or a roof opening system for a roof opening.

The vehicle roof according to the invention is in particular a roof of a passenger car, but it can also be a roof of a utility vehicle, which may be a delivery van, a bus, an autonomously driving small bus, such as a so-called people mover, or a tractor unit, for example.

The roof skin of the roof module can be a single element or be composed of multiple elements. A cover element covering the environment sensor or the sensor module comprising the environment sensor can be an integral part of the roof skin. However, it is also conceivable for the roof skin element covering the environment sensor or the sensor module to be a separate roof skin element which transitions into an adjacent roof skin element in a flush manner, forming a visually harmonious roof exterior. By suitably designing the cover element, the roof module can be adapted to given customer demands in a visually pleasing manner.

The sensor see-through area of the roof skin, which is associated with the environment sensor and can be an insert of the roof skin or an integral part of the roof skin, is advantageously transparent to the wavelengths used by the environment sensor. In particular, the sensor see-through area is configured in such a manner that signals of the environment sensor which are in a wavelength range between 300 nm and 2000 nm can pass through. Moreover, it is in particular also advantageous for the sensor see-through area to be permeable to radar beams.

To keep the total weight of the vehicle roof according to the invention low, the roof skin is at least partially realized as a lightweight constructional element, which preferably comprises or is a plastic composite component and/or an injection-molded plastic component. For example, the cover element, which is part of the roof skin and covers the environment sensor, comprises a honeycomb structure, which is bordered by fiber-reinforced polyurethane layers. In the case of an injection-molded plastic part, this cover element, which is part of the roof skin, can be made of a polycarbonate material or any other suitable plastic.

In a specific embodiment of the vehicle roof according to the invention, the roof skin forms a one-piece or a multi-piece dome, below which the environment sensor is disposed and on which the sensor see-through area or the opening is formed. The dome forms a localized elevation of the roof skin, which covers the environment sensor and comprises the sensor see-through area on the side facing the side of the roof.

In a specific embodiment of the vehicle roof according to the invention, the sensor see-through area behind which the environment sensor is located forms a plane which is at least largely parallel to the vertical longitudinal center roof plane and/or parallel to the adjacent roof edge. In an alternative embodiment, in which the environment sensor is to also detect a rear vehicle environment, the sensor see-through area can form a plane which intersects the vertical longitudinal center roof plane and/or the roof edge.

In another specific embodiment of the vehicle roof according to the invention, the roof skin can have a lateral end face or side wall (viewed from the side) which has the sensor see-through area. In this case, the roof skin adjacent to the roof side rail forms a roof line having a greater curvature than said roof side rail.

In another specific embodiment of the vehicle roof according to the invention, the roof skin comprises a bulge which covers the roof side rail associated with the environment sensor in the transverse roof direction. The environment sensor and the roof edge are preferably located below the bulge. An end face or a side wall of the bulge forms the sensor see-through area for the environment sensor.

In another specific embodiment of the vehicle roof according to the invention, the roof skin comprises a front or rear cover which can be disposed forward or to the rear of a roof opening of a roof opening system or forward or to the rear of a roof see-through area and which extends across the width of the roof module in the transverse roof direction in the manner of a spoiler, for example, the cover having a lateral end wall, which comprises the sensor see-through area or the opening, on either side of the vertical longitudinal center roof plane. So a roof module of this configuration has an area which is inclined in the manner of a spoiler in the form of the cover at the front or rear edge and through whose side walls respective environment sensors can detect the vehicle surroundings in a lateral area.

Furthermore, it is also conceivable for the roof skin to form a lateral beam-like housing portion at its longitudinal edges, which extends in the longitudinal roof direction and below which the environment sensor is disposed and which has an external side wall comprising the sensor see-through area for the environment sensor in question. The beam-like housing portion can extend across the entire length of the roof edge or just along part of the associated roof edge.

To extend the field of view of the environment sensor into areas close to the vehicle, in particular in the downward direction, the environment sensor can be disposed on a sensor support in such a manner that its cone of vision is tilted in the direction of the ground and/or relative to a support portion of the roof module. The sensor support forms a support plane, which can be inclined relative to a main plane of the support portion of the roof module, i.e., which is not parallel thereto. The support portion of the roof module can be formed by a roof frame, which forms the intersection between the roof module and the vehicle body shell, which can comprise the roof side rails.

The roof edge associated with the edge area having the environment sensor can have a depression in the area of the sensor see-through area formed on the roof skin of the roof module so that the roof line formed by the roof module can be kept lower than the roof edges. Thus, the environment sensor "looks" at the vehicle surroundings through the depression.

The invention also relates to a motor vehicle comprising a vehicle roof of the kind described above, i.e., whose vehicle body shell is provided with a roof module configured in the manner described above.

Other advantages and advantageous configurations of the subject matter of the invention are apparent from the description, the drawing, and the claims.

BRIEF DESCRIPTIONS OF THE DRAWINGS

Illustrative examples of a vehicle roof according to the invention are schematically illustrated in the drawing and will be discussed in more detail in the following description.

DETAILED DESCRIPTION

Figure 1:
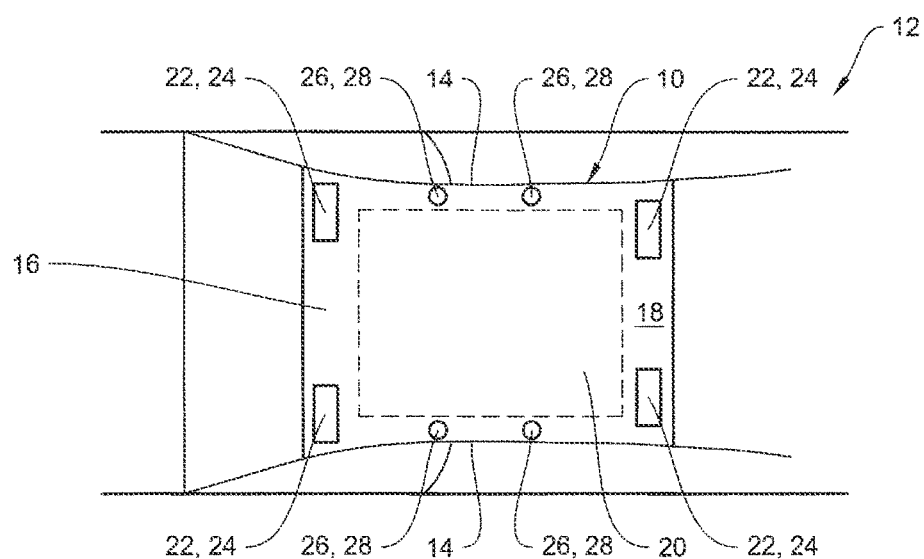
FIG. 1 is a schematic top view of a vehicle roof according to the invention.
Figure 2:
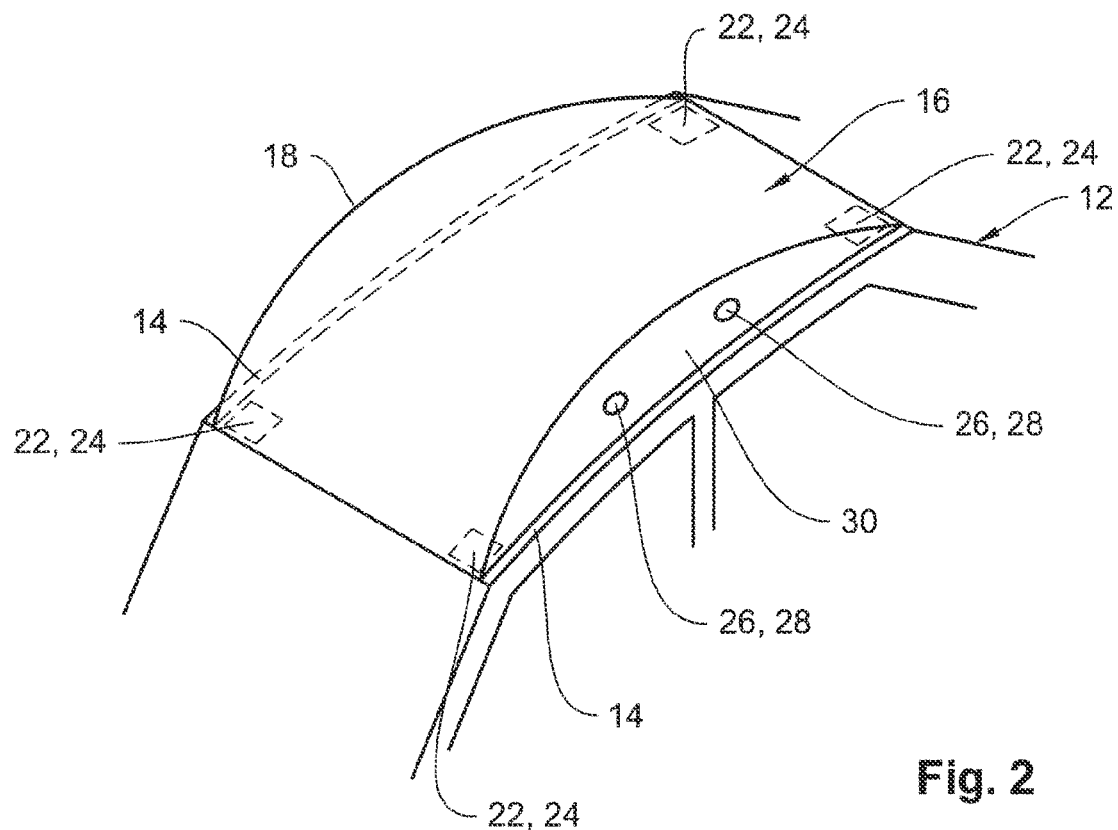
FIG. 2 is a perspective schematic view of the vehicle roof of FIG. 1.
Figure 3:
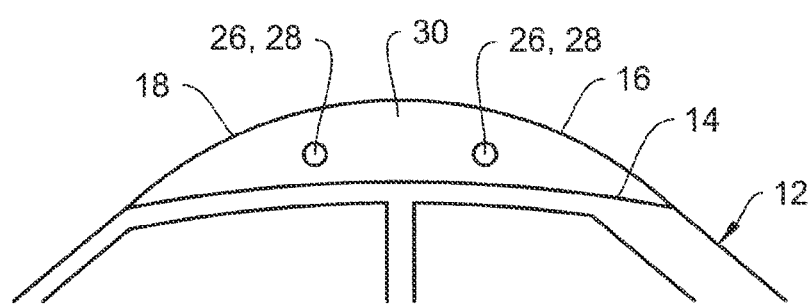
FIG. 3 is a side view of the vehicle roof of FIG. 1.

FIGS. 1 to 3 show a vehicle roof 10, which is part of a motor vehicle 12, which is a passenger car. Vehicle roof 10 comprises a roof side rail 14 on either side of a longitudinal center roof plane, roof side rails 14 being part of a vehicle body, which is a body shell. Between roof side rails 14, vehicle roof 10 comprises a roof module 16, which is tightly attached to roof side rails 14.

Roof module 16 comprises a roof skin 18, which forms a transparent roof portion in a central area, roof portion 20 allowing light to enter a vehicle interior. Roof skin 18 is attached to a circumferential roof frame (not shown), which is a support structure of roof module 16 and forms an intersection between roof module 16 and the vehicle body.

Roof module 16 is a roof sensor module (RSM), which is equipped with devices enabling the motor vehicle in question to drive autonomously. To this end, roof module 16 has a sensor system, which comprises a sensor module 22 in each of the four corner areas of roof module 16, each sensor module 22 being provided with at least one environment sensor 24, by means of which the vehicle surroundings can be detected so as to allow motor vehicle 12 to drive autonomously. Additionally, the sensor system centrally (in relation to the roof length) comprises two additional sensor modules 26 in the area of each roof side rail 14, each sensor module 26 having at least one environment sensor 28, by means of which lateral areas of the vehicle surroundings can be detected. Sensor modules 22 and 26 are disposed on the roof frame and covered by roof skin 18, which forms a cover element. A current traffic situation can be determined by evaluating the measuring signals of environment sensors 24 and 28 by means of a controller of motor vehicle 12, allowing motor vehicle 12 to autonomously adapt to the current traffic situation and behave accordingly.

Environment sensors 24 and 26 can be configured in various ways and can comprise a lidar sensor, a radar sensor, a camera, and/or any other suitable sensor, for example.

As can be seen in FIGS. 2 and 3 in particular, roof skin 18 forms respective side walls 30 at its lateral edges, side walls 30 being transparent to the wavelengths used by environment sensors 28 and thus forming sensor see-through areas. Each side wall 30 forms a step from adjacent roof side rail 14, side wall 30 forming the end face of the step. In particular, side walls 30, which form the sensor see-through areas, are each transparent to wavelengths between 200 nm and 2000 nm. A transparency to radar radiation may be required as well.

The sensor see-through areas provided by side walls 30 are situated higher than roof side rails 16 and form crescent-shaped end faces of roof skin 18. In the areas covering the vehicle interior, roof skin 18 thus forms a roof line which has a greater curvature radius than roof side rails 16 at the upper edges of side walls 30.

Figure 4:
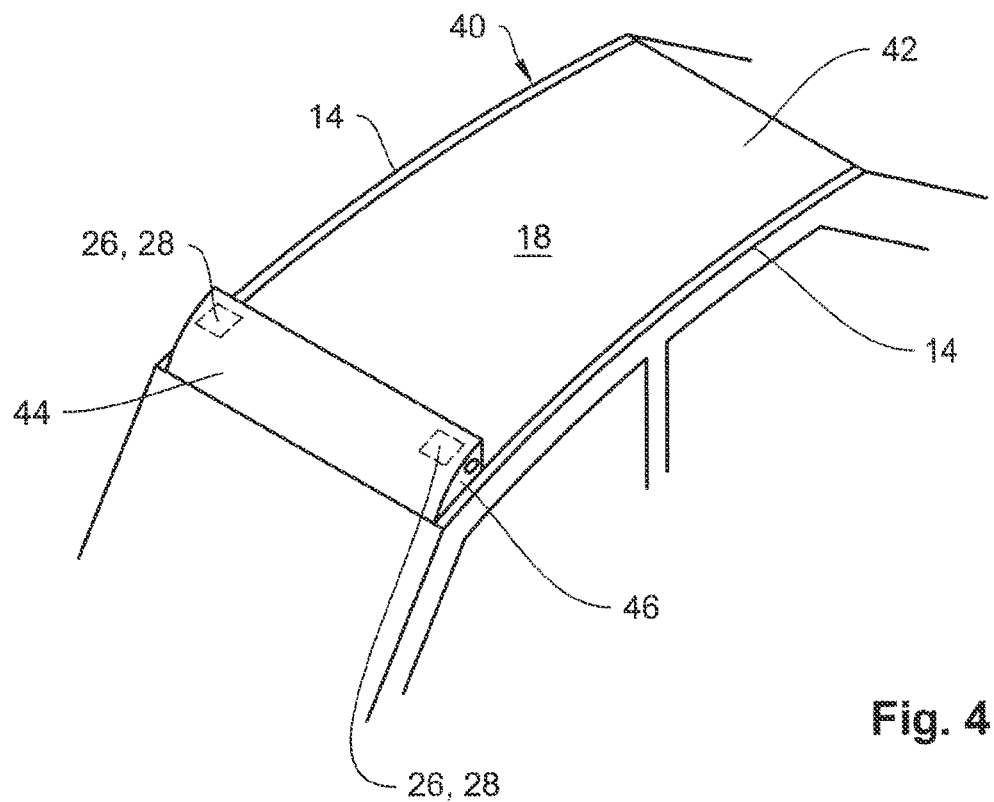
FIG. 4 is a perspective view of a second embodiment of a vehicle roof according to the invention.
Figure 5:
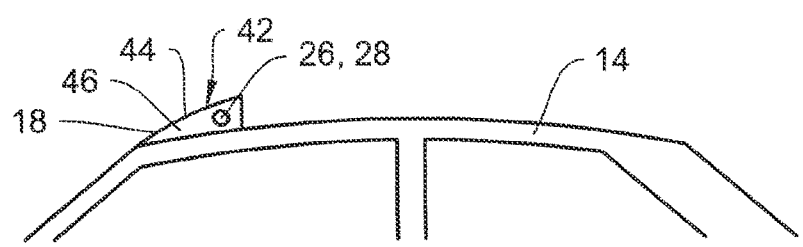
FIG. 5 is a side view of the vehicle roof of FIG. 4.

FIGS. 4 and 5 show a vehicle roof 40, which has a roof side rail 14 on either side of a vertical longitudinal center roof plane like the embodiment of FIGS. 1 to 3. A roof module 42 is disposed between roof side rails 14, roof module 42 comprising a spoiler-like front cover portion 44, which is part of a roof skin 18. Cover portion 44, which extends across the width of roof module 42, has side walls 46, which are adjacent to respective roof side rails 14 and which may fluidly transition into the topside of cover portion 44 without forming an edge. On both sides, cover portion 44 covers respective sensor modules 26, by means of which respective lateral vehicle surroundings can be detected and which each comprise an environment sensor 28, which is configured according to the environment sensors of the vehicle roof of FIGS. 1 to 3. The end walls or side walls 46 of cover portion 44 are each transparent to the wavelengths used by environment sensors 28, thus forming sensor see-through areas.

Figure 6:
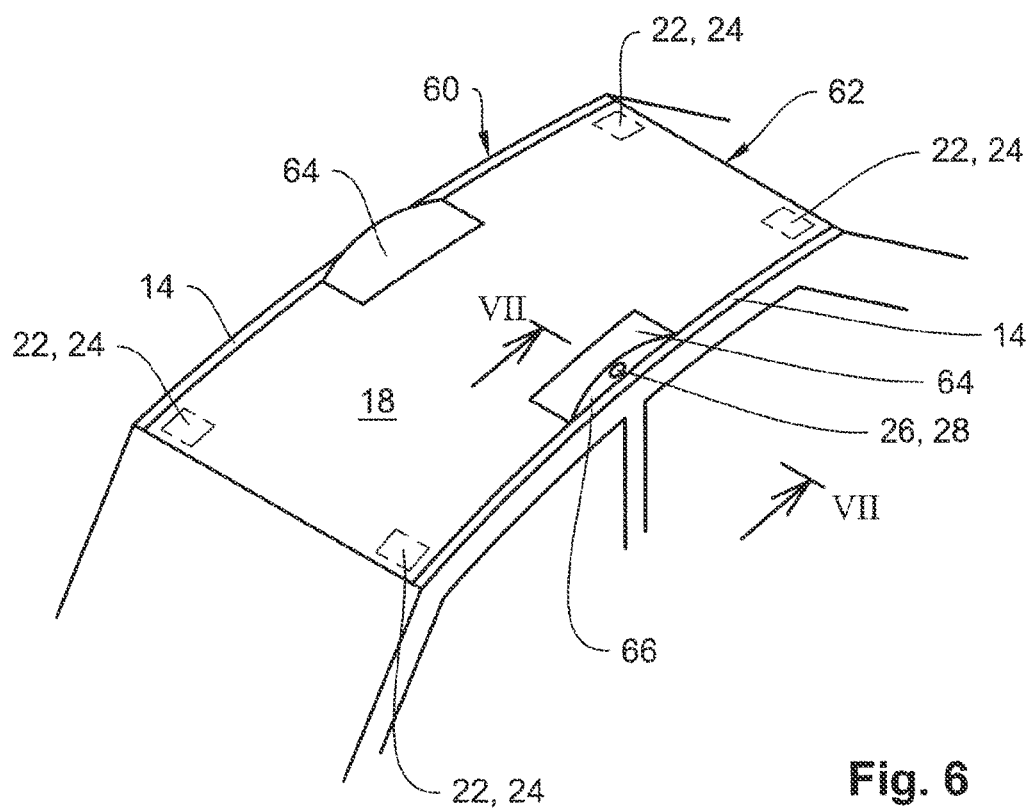
FIG. 6 is a perspective view of a third embodiment of a vehicle roof according to the invention.
Figure 7:
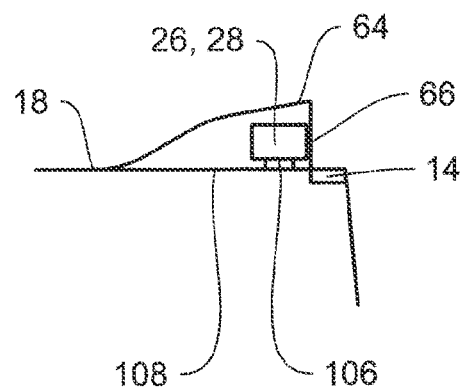
FIG. 7 is a cross section of the vehicle roof of FIG. 6 in the area of a roof side rail along line VII-VII in FIG. 6.

FIGS. 6 and 7 show a vehicle roof 60, which is essentially configured according to the vehicle roof of FIGS. 1 to 3 but differs from it in that it comprises a roof module 62, which has a roof skin 18, which forms a dome 64 in the middle on both sides with respect to the length of vehicle roof 16; each dome 64 can be considered an elevation of roof skin 18 and has an external side wall 66, which is adjacent to a respective roof side rail 14 and forms a sensor see-through area for a lateral environment sensor 28 of a sensor module 26. Environment sensor 28 is located in dome 64. The sensor see-through area formed by side wall 66 is situated higher than associated roof side rail 14, which allows environment sensor 26 to detect the lateral ground area of the vehicle surroundings close to the vehicle largely unhindered.

Otherwise, vehicle roof 60 corresponds to the vehicle roof of FIGS. 1 to 3.

Figure 8:
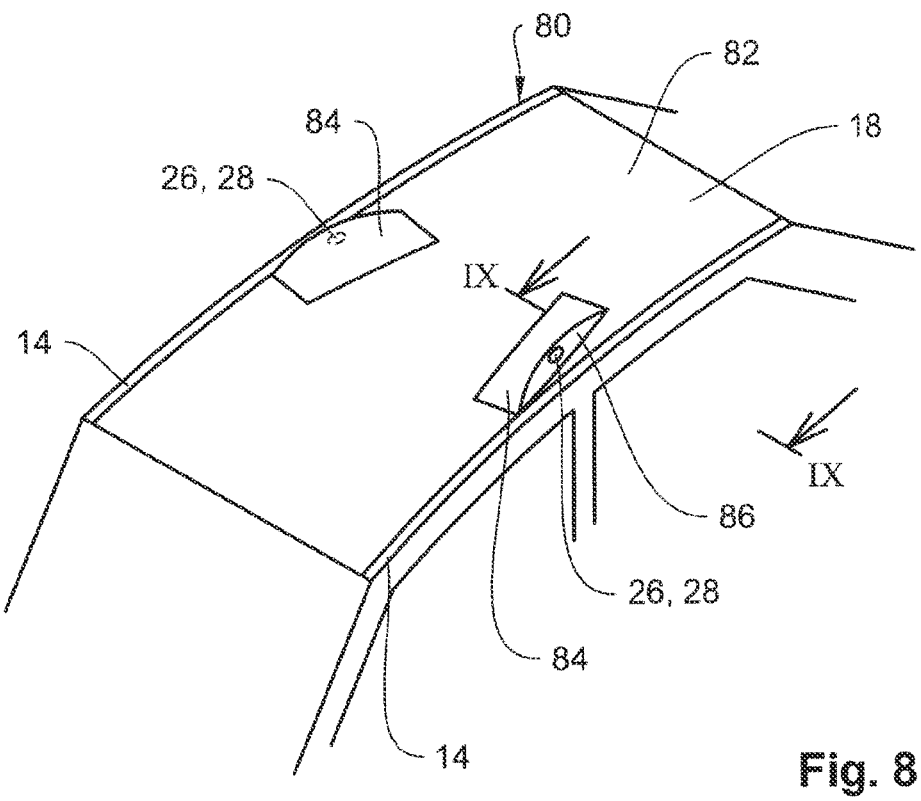
FIG. 8 is a perspective view of a fourth embodiment of a vehicle roof according to the invention.
Figure 9:
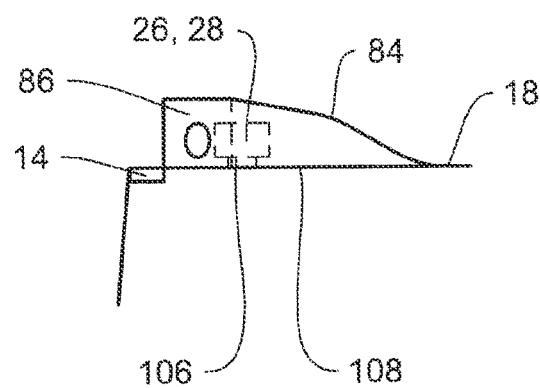
FIG. 9 is a cross section of the vehicle roof of FIG. 8 in the area of a sensor module along line IX-IX in FIG. 8.

FIGS. 8 and 9 show a vehicle roof 80, which largely corresponds to that of FIGS. 6 and 7 but differs from it in that it comprises a roof module 82, which forms a dome 84 for each of lateral central environment sensors 28 of sensor modules 26 on roof skin 18, each dome 84 having a side wall 86, which serves as a sensor see-through area for respective environment sensor 28 of respective sensor module 26 and which is inclined both relative to associated roof side rail 14 and relative to the vertical longitudinal center roof plane; i.e., side walls 86 each intersect associated roof side rail 14 and the longitudinal center roof plane when projected onto the ground. This allows environment sensors 26 to detect and assess a rear lateral area of the vehicle surroundings across roof side rails 14.

Otherwise, vehicle roof 80 corresponds to that of FIGS. 6 and 7.

Figure 10:
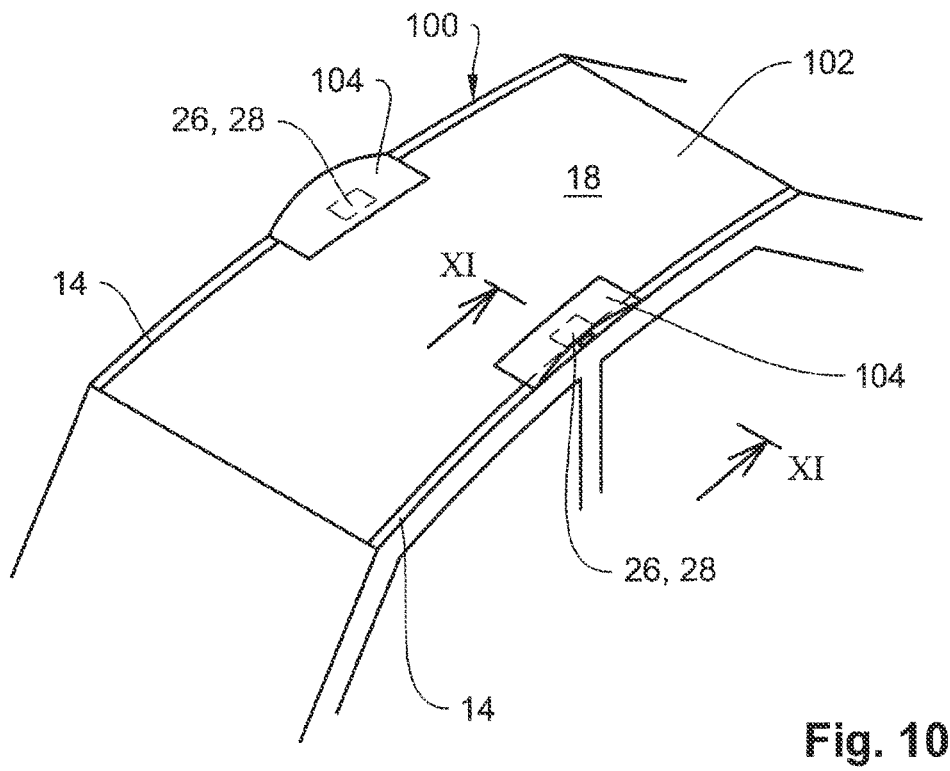
FIG. 10 is a perspective view of a fifth embodiment of a vehicle roof according to the invention.
Figure 11:
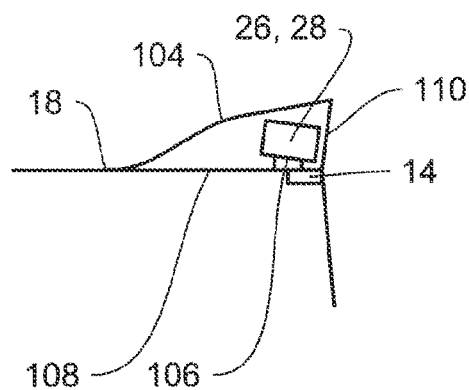
FIG. 11 is a cross section of the vehicle roof of FIG. 10 in the area of a sensor module along line XI-XI in FIG. 10.

FIGS. 10 and 11 show a vehicle roof 100, which largely corresponds to that of FIGS. 6 and 7 but differs from it in that it comprises a roof module 102, which has a roof skin 18, which forms a dome 104 in the area of each of lateral environment sensors 28 of sensor modules 26, each dome 104 covering associated roof side rail 14. Additionally, environment sensor 28 is disposed on a sensor support 106 in such a manner that it is tilted or inclined relative to a support portion 108 formed by the roof frame, which allows a cone of vision of respective environment sensor 28 to also detect ground areas of the vehicle surroundings close to the vehicle. Dome 104 forms a side wall 110, which forms a sensor see-through area and is therefore transparent to the wavelengths used by respective environment sensor 28.

Otherwise, vehicle roof 100 corresponds to that of FIGS. 6 and 7.

Figure 12:
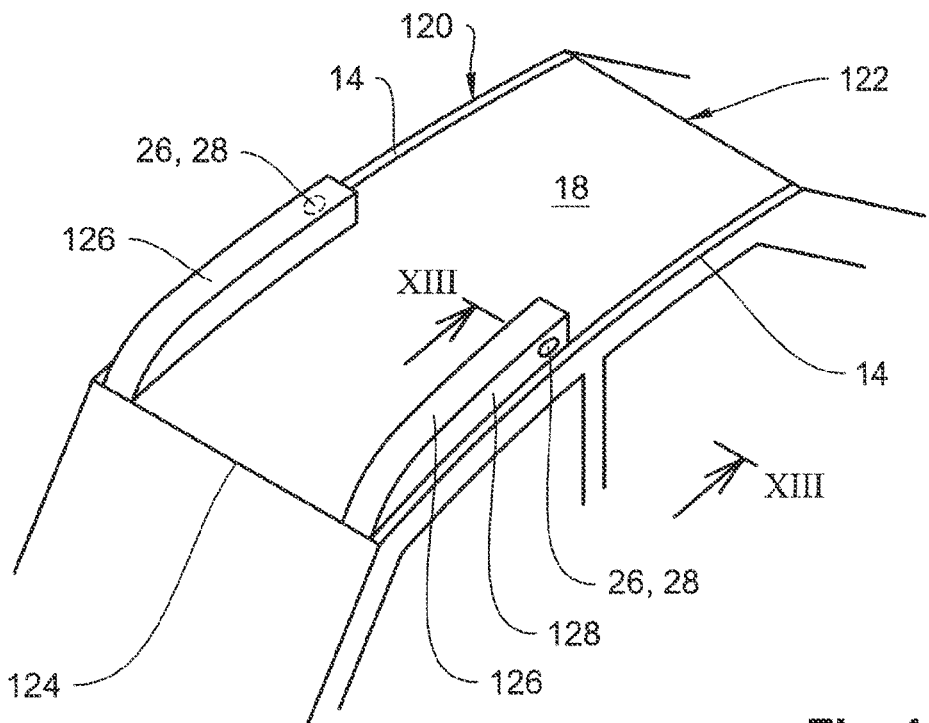
FIG. 12 is a perspective view of a sixth embodiment of a vehicle roof according to the invention.
Figure 13:
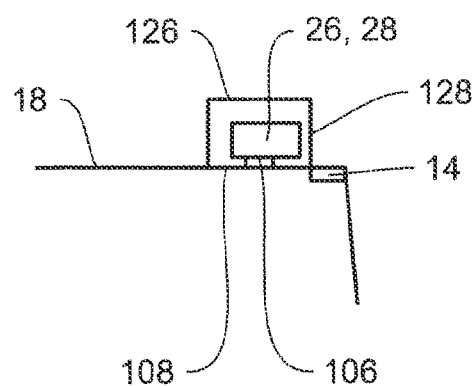
FIG. 13 is a cross section of the vehicle roof of FIG. 12 in the area of a sensor module along line XIII-XIII in FIG. 12.

FIGS. 12 and 13 show a vehicle roof 120, which largely corresponds to that of FIGS. 6 and 7 but differs from it in that it comprises a roof module 122, which is laterally bordered by roof side rails 14 and forms a roof skin 18, forms a beam-like housing 126 on either side starting from a front header 124, housing 126 having a side wall 128, which is transparent to wavelengths used by environment sensors 28 of sensor modules 16. Side walls 128, which are situated higher than and adjacent to roof side rails 14, form sensor see-through areas for environment sensors 28.

Otherwise, roof module 122 corresponds to that of FIGS. 6 and 7, which is why reference is made to the description thereof.

Figure 14:
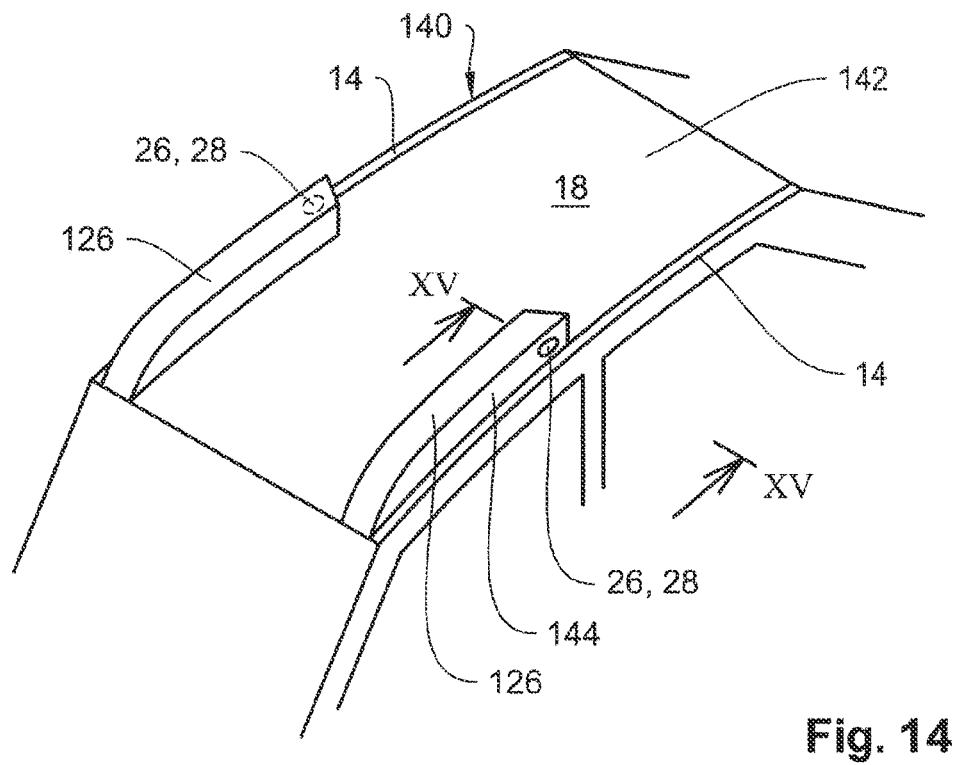
FIG. 14 is a perspective view of a seventh embodiment of a vehicle roof according to the invention along line XV-XV in FIG. 14.
Figure 15:
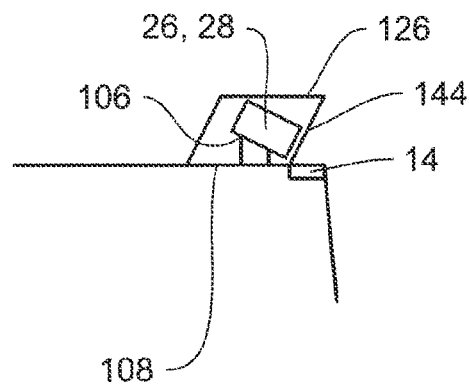
FIG. 15 is a cross section of the vehicle roof of FIG. 14 in the area of a sensor module.

FIGS. 14 and 15 show a vehicle roof 140, which largely corresponds to that of FIGS. 12 and 13 but differs from it in that it comprises a roof module 142, which has lateral environment sensors 28, which are disposed on a sensor support 106, environment sensors 28 being tilted relative to a support portion 108, which is formed by the roof frame, with the result that a cone of vision of environment sensors 28 is pivoted in the direction of ground areas close to the vehicle. A side wall 142 of beam-like housing 126 is inclined corresponding to the inclination of sensor support 106.

Otherwise, roof module 122 corresponds to that of FIGS. 12 and 13.

Figure 16:
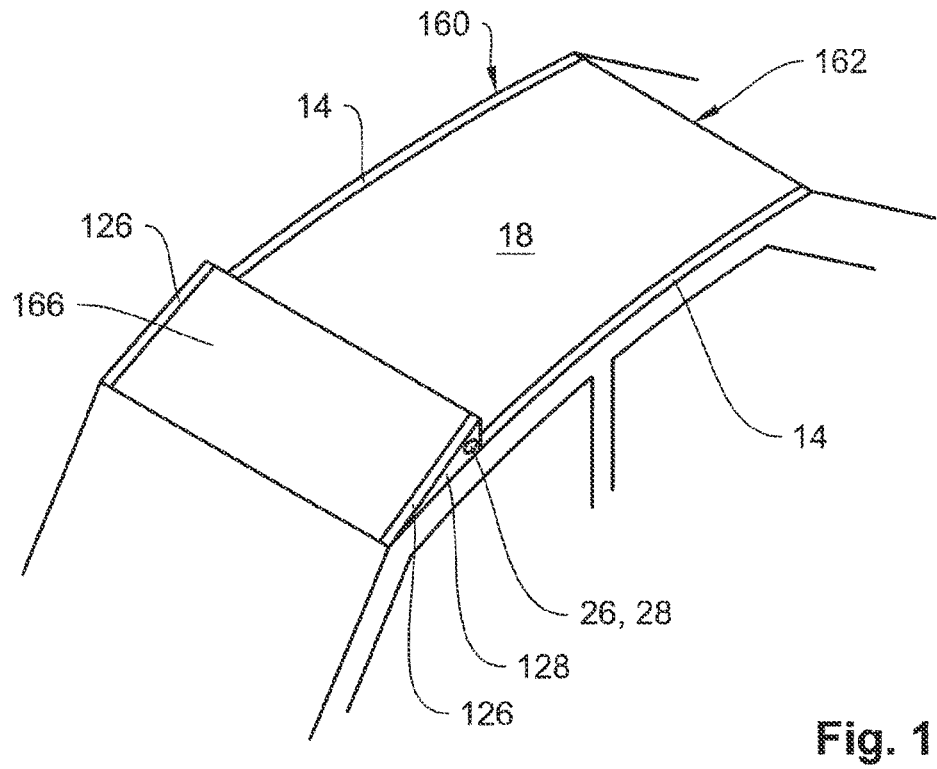
FIG. 16 is a perspective view of an eighth embodiment of a vehicle roof according to the invention comprising a roof opening with a lid element in a closed position.
Figure 17:
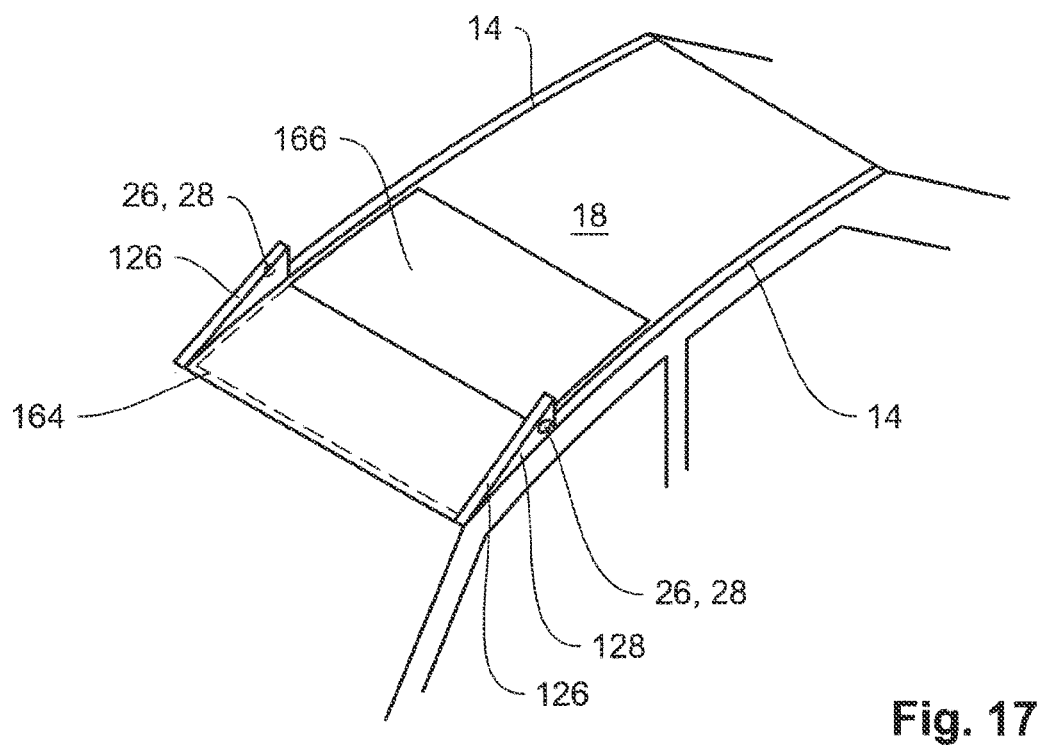
FIG. 17 shows the vehicle roof of FIG. 16 with the lid element in an open position.

FIGS. 16 and 17 show a vehicle roof 160, which largely corresponds to the vehicle roof of FIGS. 12 and 13 but differs from it in that it comprises a roof module 162, which has a roof opening 144, which can be opened or at least partially opened at will by means of a lid element 166. Laterally next to roof opening 164, roof module 162 comprises beam-like housings 126, which are part of roof skin 18 and in each of which a lateral sensor module 26 with an environment sensor 28 is disposed, environment sensor 28 serving to detect a lateral area of the vehicle surroundings. Corresponding to the embodiment of FIGS. 12 and 13, housings 126 each form a side wall 128, which serves as a sensor see-through area and is therefore transparent to the wavelengths used by environment sensors 28.

Otherwise, vehicle roof 160 largely corresponds to that of FIGS. 12 and 13.

Environment sensors 24 and 28 of the embodiments described above can each be provided with cleaning systems, thermal systems, and/or the like, which ensure an undisturbed operation thereof.

The invention claimed is:

1. A vehicle roof comprising:
   a support on the vehicle body shell,
   a roof module disposed on the support and having a roof skin, and
   a sensor system having at least one sensor module comprising at least one environment sensor for detecting a vehicle environment, the environment sensor being disposed in a lateral edge area of the roof module associated with a lateral roof edge and being covered by the roof skin, the roof skin having a sensor see-through area for the environment sensor, the sensor see-through area being oriented in the transverse roof direction and being situated higher than the associated roof edge or an adjacent area of the associated roof edge and/or being located above the associated roof edge;
   wherein the roof skin forms a lateral beam-like housing portion which extends in the longitudinal roof direction and below which the environment sensor is disposed and which has an external side wall which comprises the sensor see-through area.

2. The vehicle roof according to claim 1, wherein the roof skin comprises a dome below which the environment sensor is disposed and on which the sensor see-through area is formed.

3. The vehicle roof according to claim 1, wherein the roof see-through area forms a plane which intersects the vertical longitudinal center roof plane and/or the roof edge.

4. The vehicle roof according to claim 1, wherein the roof skin has a lateral end face which has the sensor see-through area.

5. The vehicle roof according to claim 1, wherein the roof skin has a bulge which covers the roof edge associated with the environment sensor in the transverse roof direction.

6. The vehicle roof according to claim 1, wherein the roof skin comprises a front cover.

7. The vehicle roof according to claim 1, wherein the environment sensor is disposed on a sensor support in such a manner that its cone of vision is tilted toward the ground and relative to a support portion of the roof module.

8. The vehicle roof according to claim 1, wherein the roof edges are each formed by a roof side rail comprised by the support on the vehicle body shell.

9. A motor vehicle comprising a vehicle roof according to claim 1.

10. The vehicle roof according to claim 6, wherein the roof skin front cover is disposed forward of a roof opening.

11. The vehicle roof according to claim 1, wherein the roof skin comprises another see-through area on a side of a vertical longitudinal center roof plane.

\* \* \* \* \*